(12) United States Patent
Park et al.

(10) Patent No.: US 8,699,071 B2
(45) Date of Patent: Apr. 15, 2014

(54) IMAGE FORMING APPARATUS AND METHOD OF FORMING AN IMAGE THEREOF

(75) Inventors: Soo-hee Park, Suwon-si (KR); Jin-sil Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/353,723

(22) Filed: Jan. 19, 2012

(65) Prior Publication Data

US 2013/0021644 A1 Jan. 24, 2013

(30) Foreign Application Priority Data

Jul. 20, 2011 (KR) ........................ 10-2011-0072043

(51) Int. Cl.
*G06F 3/12* (2006.01)
*G06K 15/00* (2006.01)

(52) U.S. Cl.
USPC .......................... 358/1.15; 358/1.16; 358/1.13

(58) Field of Classification Search
None
See application file for complete search history.

(56) References Cited

U.S. PATENT DOCUMENTS

| 7,990,557 B2 | 8/2011 | Tsunekawa |
| 2007/0052998 A1 | 3/2007 | Tsunekawa |
| 2010/0073725 A1* | 3/2010 | Tian ............................ 358/1.15 |
| 2011/0235099 A1* | 9/2011 | Ito ............................... 358/1.15 |

FOREIGN PATENT DOCUMENTS

JP 2007-069357 3/2007

* cited by examiner

*Primary Examiner* — Dov Popovici
(74) *Attorney, Agent, or Firm* — Stanzione & Kim, LLP

(57) ABSTRACT

An image forming apparatus including: a communication interface unit to receive print data; an image processing unit to convert the received print data into pages of bitmap image data; an image forming unit to print the pages and having a queuing time; and a queuing time changing unit to change the queuing time according to a conversion time of the print data by the image processing unit.

19 Claims, 8 Drawing Sheets

FIG. 3
(Related Art)

| | page1 | page2 | page3 | page4 | page5 | page6 | page7 | page8 | page9 | page10 |
|---|---|---|---|---|---|---|---|---|---|---|
| CONVERSION TIME | 4s | 4s | 4s | 4s | 4s | 4s | 4s | 4s | 4s | 4s |
| QUEUING TIME | 2s | 2s | 2s | 2s | 2s | 2s | 2s | 2s | 2s | 2s |
| PRINT TIME | 10s | 10s | 10s | 10s | 10s | 10s | 10s | 10s | 10s | 10s |

FIG. 4

|  | page1 | page2 | page3 | page4 | page5 | page6 | page7 | page8 | page9 | page10 |
|---|---|---|---|---|---|---|---|---|---|---|
| CONVERSION TIME | 4s | 4s | 4s | 4s | 4s | 4s | 4s | 4s | 4s | 4s |
| QUEUING TIME | 2s | 3s | 4s | 4s | 4s | 4s | 4s | 4s | 4s | 4s |
| PRINT TIME | 10s | 10s | 4s | 4s | 4s | 4s | 4s | 4s | 4s | 4s |

FIG. 5

|  | page1 | page2 | page3 | page4 | page5 | page6 | page7 | page8 | page9 | page10 |
|---|---|---|---|---|---|---|---|---|---|---|
| CONVERSION TIME | 4s | 4s | 4s | 4s | 4s | 4s | 4s | 4s | 4s | 4s |
| QUEUING TIME | 2s | 2.6s | 3.2s | 3.8s | 4.4s | 4.4s | 4.4s | 4.4s | 4.4s | 4.4s |
| PRINT TIME | 10s | 10s | 10s | 10s | 4s | 4s | 4s | 4s | 4s | 4s |

FIG. 6

|  | page1 | page2 | page3 | page4 | page5 | page6 | page7 | page8 | page9 | page10 |
|---|---|---|---|---|---|---|---|---|---|---|
| CONVERSION TIME | 1s | 2s | 3s | 4s | 5s | 6s | 5s | 4s | 3s | 2s |
| QUEUING TIME | 2s | 2.5s | 3s | 3.5s | 4s | 5s | 5.5s | 5.5s | 5.5s | 5.5s |
| PRINT TIME | 10s | 2s | 3s | 10s | 10s | 10s | 5s | 4s | 3s | 2s |

FIG. 7

|  | page1 | page2 | page3 | page4 | page5 | page6 | page7 | page8 | page9 | page10 |
|---|---|---|---|---|---|---|---|---|---|---|
| CONVERSION TIME | 4s | 4s | 4s | 4s | 4s | 4s | 1s | 1s | 1s | 1s |
| QUEUING TIME | 2s | 5s | 5s | 5s | 5s | 5s | 5s | 2s | 2s | 2s |
| PRINT TIME | 10s | 4s | 4s | 4s | 4s | 4s | 2s | 2s | 2s | 2s |

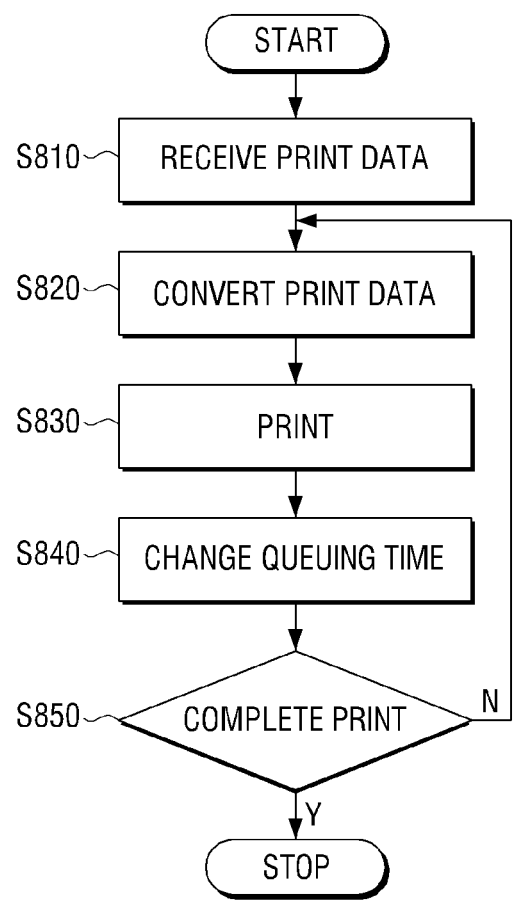

IMAGE FORMING APPARATUS AND METHOD OF FORMING AN IMAGE THEREOF

CROSS-REFERENCE TO RELATED APPLICATION

This application claims the benefit under 35 U.S.C. §119 from Korean Patent Application No. 10-2011-0072043, filed on Jul. 20, 2011, in the Korean Intellectual Property Office, the disclosure of which is incorporated herein by reference in its entirety.

BACKGROUND

1. Field

The present general inventive concept generally relates to an image forming apparatus and method that can control a queuing time according to a conversion time of print data.

2. Description of the Related Art

An image forming apparatus is an apparatus that prints print data generated by a terminal such as a computer, on a printable medium, such as printing paper. An image forming apparatus may be, for example, a copier, a printer, a facsimile, a multi-function peripheral (MFP) apparatus, and the like. Such an image forming apparatus converts received print data into bitmap image data, drives an image forming engine therein to pick up a paper when the bit map image data is prepared, and controls a laser scanning unit (LSU), a fuser, a developer, or the like, to perform an actual output operation.

When continuously printing multiple pages, a conversion time for the bitmap image data of each print page may vary from a normal output time of an image forming unit. In this case, the image forming apparatus stops operating to protect a developer roller and/or a LSU polygon motor thereof.

However, stopping and restarting the image forming engine takes a certain amount of time, according to the acceleration and deceleration control of the motor and roller. When the image forming apparatus stops, a time period referred to as a "first page out time" (FPOT) is generally needed to restart a printing job.

Since the queuing time is fixed in the image forming apparatus of the related art, when continuously printing multiple pages involving complicated image conversion, an image forming engine may be stopped and restarted successively for each page.

SUMMARY

The present general inventive concept provides an image forming apparatus and method that can control a queuing time of an image forming unit, according to a conversion time during which print data is converted into bitmap image data.

Exemplary embodiments of the present general inventive concept will be set forth in part in the description which follows and, in part, will be obvious from the description, or may be learned by practice of the general inventive concept.

The foregoing and/or other features and utilities of the present general inventive concept may be achieved by an image forming apparatus including: a communication interface unit to receive print data having a plurality of pages; an image forming unit having a preset queuing time and to form an image on a printable medium (printing paper); an image processing unit to convert the received print data into pages of bitmap image data; and a queuing time changing unit to change the queuing time of the image forming unit, according to a conversion time of the print data by the image processing unit.

The image forming unit may enter a standby state during the queuing time, during which a motor of the image forming unit continuously operates.

The queuing time changing unit may increase the queuing time by a preset unit of time, when the conversion time of the print data is longer than a preset reference time.

The queuing time changing unit may reduce the queuing time by the preset unit of time, when the conversion time of the print data is shorter than the preset reference time.

The queuing time changing unit may change the queuing time to a preset minimum queuing time, when the conversion time of the print data is shorter than the preset reference time.

The queuing time changing unit may change the queuing time to a preset maximum queuing time that is longer than the conversion time, when the conversion time of the print data is longer than the preset reference time.

The image processing unit may include a plurality of hardware accelerators. The image processing unit may convert the received print data into the bitmap image data using the hardware accelerators. The queuing time changing unit may change the queuing time according to conversion times of each of the hardware accelerators.

In this case, the hardware accelerator may be at least one selected from the group consisting of a scaling accelerator, a halftoning accelerator, a color conversion accelerator, a graphic processing accelerator, and an image rotation processing accelerator.

The queuing time changing unit may change the queuing time of the image forming unit for each page of print data.

The queuing time changing unit may change the queuing time after groups of the pages are printed.

The foregoing and/or other features and utilities of the present general inventive concept may also be achieved by a method of forming an image of an image forming apparatus, the method including: receiving print data; converting the received print data into pages of bitmap image data; using an image forming unit to print the pages; and changing a queuing time of the image forming unit, according to a conversion time of the pages.

The image forming unit may enter a standby state during the queuing time.

The changing the queuing time may include increasing the queuing time by a preset unit of time, when a conversion time of the print data is longer than a preset reference time.

The changing the queuing time may include reducing the queuing time by the preset unit of time, when the conversion time of the print data is shorter than a preset minimum queuing time.

The changing the queuing time may include changing the queuing time to the preset minimum queuing time, when the conversion time of the print data is shorter than the reference time.

The changing the queuing time may include changing the queuing time to a preset maximum queuing time, which is longer than the conversion time, when the conversion time of the print data is longer than the reference time.

The converting the print data may include changing the received print data using hardware accelerators. The changing the queuing time may include changing the queuing time of the image forming unit according to a conversion time of each of the hardware accelerators.

The changing queuing time may include changing the queuing time of an image forming unit for each page of the print data.

The changing the queuing time may include changing the queuing time of an image forming unit after groups of the pages are printed.

BRIEF DESCRIPTION OF THE DRAWINGS

These and/or other features and utilities of the present general inventive concept will become apparent and more readily appreciated from the following description of the embodiments, taken in conjunction with the accompanying drawings, of which:

FIG. 3 is a view illustrating a printing operation times of a conventional image forming apparatus;

FIGS. 4 to 7 are views illustrating printing operation times of an image forming apparatus, according to an exemplary embodiment; and FIG. 8 is a flowchart illustrating a method of forming an image, according to an exemplary embodiment.

DETAILED DESCRIPTION OF THE EXEMPLARY EMBODIMENTS

Figure 1:
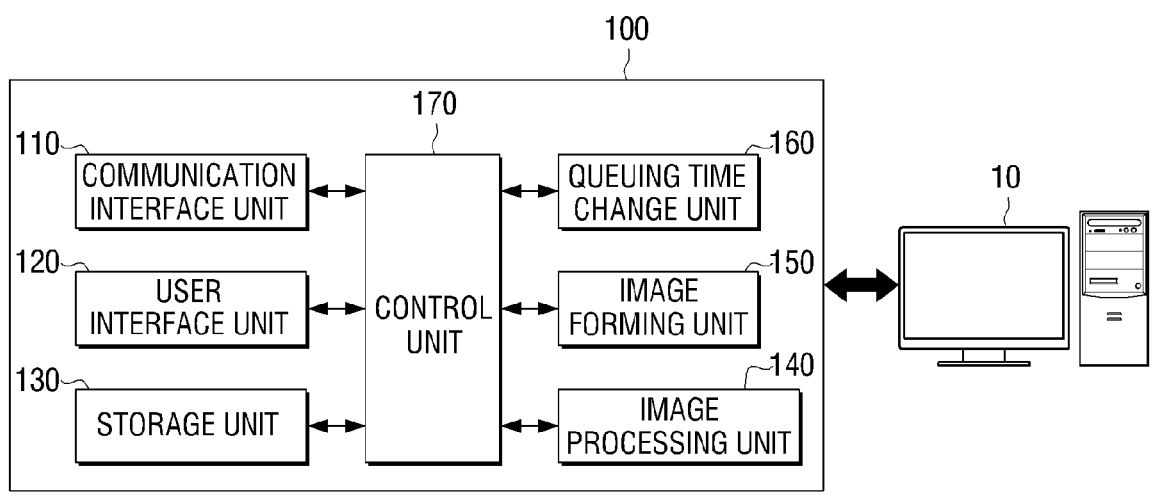
FIG. 1 is a block diagram illustrating a configuration of an image forming apparatus, according to an exemplary embodiment.

Reference will now be made in detail to the exemplary embodiments of the present general inventive concept, examples of which are illustrated in the accompanying drawings, wherein like reference numerals refer to like elements throughout. The exemplary embodiments are described below, in order to explain the present general inventive concept, by referring to the figures.

FIG. 1 is a block diagram illustrating an image forming apparatus 100, according to an exemplary embodiment of the present inventive concept. Referring to FIG. 1, the image forming apparatus 100 includes a communication unit 110, a user interface unit 120, a storage unit 130, an image processing unit 140, an image forming unit 150, a queuing time changing unit 160, and a control unit 170.

The communication interface unit 110 is connected to a print control terminal 10, such as a personal computer (PC), a notebook PC, a personal digital assistant (PDA), a digital camera, or the like. Specifically, the communication interface unit 110 is configured to connect the image forming apparatus 100 to any suitable external apparatus. The communication interface unit 110 and may be connected to the print control terminal 10 through a local area network (LAN) and/or an Internet network, or through a universal serial bus (USB) port. The communication interface unit 110 may be connected to the print control terminal 10 in a wired or wireless manner.

The communication interface unit 110 receives print data from the print control terminal 10. Here, the print data may be page description language (PDL) written in a printer command language (PCL) or a postscript (PS) language, and may also be graphic device interface (GDI) data generated in a printer driver of the print control terminal 10, a XML paper specification (XML) file, and the like. Although only receiving the print data from the print control terminal 10 has been described, the image forming apparatus 100 may be configured for a direct file transfer.

The user interface unit 120 includes functional keys that may be used to set or select various functions supported by the image forming apparatus 100. The user interface unit 120 generally displays a variety of information provided from the image forming apparatus 100. The user interface unit 120 may be implemented with an apparatus in which input and output are simultaneously implemented, such as a touch pad or an apparatus in which a mouse and a monitor are combined. A user may select a job to be performed using a user interface window provided through the user interface unit 120.

The storage unit 130 stores the print data received through the communication interface unit 110. The storage unit 130 may store data processed in the image processing unit, which is described below.

The storage unit 130 may be implemented with an internal storage medium of the image forming apparatus 100 and/or an external storage medium, for example, a removable disk including a universal serial bus (USB) memory, a web server implemented through a network, or the like. Although storage unit 130 has been illustrated as one unit, the storage unit 130 may be implemented with a memory for data storage and a memory for command processing.

The image processing unit 140 may convert received print data into data recognizable by the image forming unit 150. Specifically, the image processing unit 140 may convert the print data into pages of bitmap image data.

Figure 2:
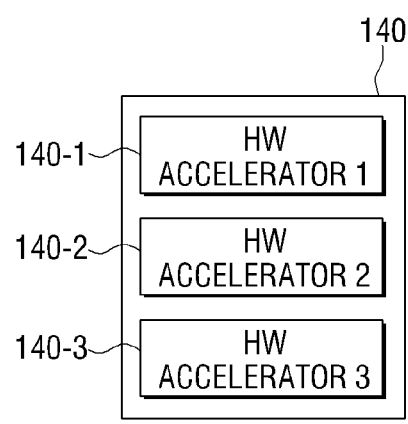
FIG. 2 is a view illustrating a detailed configuration of an image processing unit of FIG. 1.

As shown in FIG. 2, the image processing unit 140 may include hardware accelerators 140-1, 140-2, and 140-3. The hardware accelerators 140-1, 140-2, and 140-3 may convert the received print data into bitmap image data. Herein, a hardware accelerator is a processing unit which performs a specific image processing operation, such as a digital signal processor. A hardware accelerator may be a scaling accelerator, a halftoning accelerator, a color conversion accelerator, a graphic processing accelerator, or an image rotation processing accelerator.

While the embodiment of FIG. 2 described with respect to hardware accelerators, a software functional block may be used to implement the image processing unit 140, in place of the hardware accelerators. In addition, the present inventive concept is not limited to the three hardware accelerators shown in FIG. 2. In particular, any suitable number of hardware accelerators may be used.

The image forming unit 150 forms an image using the bitmap image data. Specifically, the image forming unit 150 may form the image on a printable medium (printing paper) using the bitmap image data provided from the image processing unit 140.

The image forming unit (or an engine unit) 150 has a preset queuing time. Specifically, the image forming unit 150 may perform a printing operation to form an image on a printing paper and then stop the operation of internal components thereof, when the preset queuing time has elapsed. Thus, the image forming unit 150 can protect the lifespan of a developer roller or an LSU polygon motor. Alternatively, the image forming unit 150 may perform a first printing operation and may then perform a second printing operation without stopping the components thereof, when next bitmap image data of the second printing operation is received before the preset queuing time has elapsed. Here, the queuing time is a time during which the image forming unit enters a standby state, during which printing is not performed but a motor in the image forming unit 150 remains active.

The queuing time changing unit 160 changes the queuing time of the image forming unit 150, according to a print data conversion time of the image processing unit 140. Specifically, the queuing time changing unit 160 may increase the queuing time by a preset unit of time, when the conversion time is longer than a preset reference time. The changing the queuing time may be performed for each page of the print data. The changing the queuing time may be performed according to page units (groups of pages) of, for example, three pages.

Here, the reference time is a conversion time of the image processing unit 140 that allows the image forming unit 150 to operate at a normal output rate. For example, when a printing operation of 30 ppm is supported by the image forming apparatus 100, one page may be printed every two seconds and the reference time may be one second, considering other conversion jobs, and the like. The reference time may be set by a manufacturer according to experimental data. The unit of time denotes a change amount of the queuing time, for example, 0.5 seconds.

When a default queuing time is 2 seconds, the unit of time is 0.5 second, and the conversion time of the image processing unit 140 is 3 seconds, the queuing time changing unit 160 may change the queuing time from 2 seconds to 2.5 seconds. When the conversion time of the image processing unit 140 for a subsequent page is 3 seconds, the queuing time changing unit 160 may change the queuing time from 2.5 seconds to 3 seconds. Through the above-described process, the queuing time changing unit 160 may gradually increase the queuing time of the image forming unit 150. The queuing time changing unit 160 may be configured to limit the queuing time to a preset maximum queuing time. For example, the queuing time changing unit 160 may configured such that the set queuing time does not exceed 10 seconds, even when the queuing time is gradually increased.

Alternatively, the queuing time changing unit 160 may change the queuing time to a the maximum queuing time, when the conversion time of the image processing unit 140 is longer than the reference time. Here, the maximum queuing time denotes a maximum conversion time of the image processing unit 140, for example, 6 seconds. The maximum queuing time may be set by a manufacturer through experimentation.

When the default queuing time is 2 seconds, the reference time is 1 second, and the conversion time of the image processing unit 140 is 3 seconds, the queuing time changing unit 160 may change the queuing time from 2 seconds to 6 seconds. The queuing time changing unit 160 may reduce the queuing time by the preset unit of time or change the queuing time to a preset minimum queuing time, when the conversion time of the print data is shorter than the reference time. Here, the minimum queuing time may a default queuing time.

Further, the queuing time changing unit 160 may change the queuing time of the image forming unit according the conversion time of each hardware accelerator of the image processing unit 140. Specifically, the queuing time changing unit 160 may set different reference times for each hardware accelerator and may increase the queuing time by the unit of time corresponding to a corresponding hardware accelerator, when a processing rate of a hardware accelerator is longer than the reference time of the corresponding hardware accelerator.

When the default queuing time is 2 seconds, the reference time, unit of time, and conversion time of the first hardware accelerator 140-1 is 0.5 second, 1 second, and 1 second, respectively, and the reference time, unit of time, and conversion time of the second hardware accelerator 140-2 is 0.5 second, 0.3 second, and 0.6 second, respectively, the queuing time changing unit 160 may change the queuing time from 2 seconds to 2.6 seconds. The queuing time changing unit 160 may change the queuing time to the default queuing time, when a printing job is completed.

Although an example has been described in which the queuing time changing unit 160 changes the queuing time by comparing the conversion time of the print data with the reference time, the queuing time changing unit 160 may be implemented to change a queuing time by comparing the conversion time of the print data with the queuing time.

The control unit 170 controls each component in the image forming apparatus 100. Specifically, when print data is received from the print control terminal 10, the control unit 170 may control the image processing unit 140 to convert the received image data to data and control the image forming unit 150 to print the converted print data. The control unit 170 may control the queuing time changing unit 160 to change the queuing time of the image forming unit 150, according to the conversion time of the image processing unit 140.

As described above, the image forming apparatus 100 according to the exemplary embodiment may change the queuing time of the image forming unit 150, to prevent an increase in the printing rate thereof, due to an increase in an image processing time of the image processing unit 140.

FIG. 3 is a view illustrating a printing operation of a conventional image forming apparatus. Referring to FIG. 3, a queuing time of an image forming unit is fixed at 2 seconds. Therefore, when 4 seconds are required to convert each page of print data, a print time (FPOT time) of, for example, 10 seconds is required to print each page, due to the stopping and restarting of a print engine. The print engine is stopped and restarted, because the conversion times exceed the queuing time. Thus, it takes 100 seconds to print 10 pages.

FIGS. 4 to 7 are views illustrating a printing operation of the image forming apparatus, according to an exemplary embodiment. Referring to FIG. 4, print data of 10 pages are sequentially converted into image data and printed. The queuing time changing unit 160 may increase the queuing time by a preset unit of time, when the conversion time of the image processing unit 140 exceeds the preset reference time. For example, since the page 1 conversion time is 4, which exceeds the set queuing time of 2 seconds, the queuing time changing unit 160 may change the queuing time from 2 seconds to 3 seconds, after printing page 1. With regard to page 2, since the conversion time of 4 seconds still exceeds the adjusted queuing time of 3, the queuing time changing unit 160 may change the queuing time from 3 seconds to 4 seconds, after printing page 2. By increasing the queuing time, the printing job may be performed without the conversion time exceeding the queuing time from page 3 onward. That is, after page 2 is printed the printing engine is not powered down. In this case, 10 pages may be printed in 52 seconds. Thus, the printing rate is increased, as compared with that of FIG. 3, by changing only the queuing time.

In FIG. 4 the queuing time is changed to 4 seconds and is then maintained at 4 seconds. However, he changing the queuing time may be implemented to continuously of selectively change the queuing time.

FIG. 5 illustrates operations of the image forming apparatus 100, with respect to the hardware accelerators 140-1, 140-2, and 140-3, when sequentially converting and printing print data of 10 pages. Referring to FIG. 5, the hardware accelerators 140-1, 140-2, and 140-3 respectively have: reference times of 0.5 seconds, 1 second, and 0.5 seconds; time units of 0.2 seconds, 0.4 seconds, and 0.2 seconds; and conversion times of 1.2 seconds, 2.4 seconds, and 0.4 seconds. The sum of the reference times results in an initial queuing time of 2 seconds, which is applied to page 1. In this example, the individual conversion times are the same for each page, resulting in a consistent conversion time of 4 seconds.

Since the conversion times of the hardware accelerators 140-1 and 104-2 exceed the corresponding reference times, the queuing time changing unit 160 increases the queuing time of 2 seconds to a queuing time of 2.6 seconds, by adding the time units of the hardware accelerators 140-1 and 140-2 to the initial queuing time. The queuing time of 2.6 seconds is applied to page 2. In addition, the reference conversion times of the hardware accelerators 140-1 and 140-2 are increased by the respective time units, resulting reference times of 0.7 seconds, 1.4 seconds, and 0.5 seconds for the hardware accelerators 140-1, 140-2, and 140-3, respectively.

The process is repeated for page 2, using the modified queuing and reference times. Since the modified reference times (0.7 seconds and 1.4 seconds) of the hardware accelerators 140-1 and 140-2 are still less than the corresponding conversion times, the reference times of the hardware accelerators 140-1 and 140-2 are increased to 0.9 and 1.8, respectively. In addition, the queuing time is increased to 3.2 seconds. The process is repeated for the remaining pages.

As a result, the queuing time is increased to 4.4 seconds after page 4 is printed. The 4.4 second queuing time corresponds to reference times of 1.3 seconds, 2.6 seconds, and 0.5 seconds, all of which are greater than the corresponding conversion times of 1.2 seconds, 2.4 seconds, and 0.4 seconds of the hardware actuators 140-1, 140-2, and 104-3. Thus, the queuing time is maintained at 4.4 seconds for pages 5-10. As such, the printing job may be performed without exceeding the queuing time after a fifth page, so that the ten pages are printed in 64 seconds.

FIG. 6 illustrates operations of the image forming apparatus 100, when printing print data of 10 pages having different conversion times. The conversion times of pages 1-10 are respectively 1 second, 2 seconds, 3 seconds, 4 seconds, 5 seconds, 6 seconds, 5 seconds, 4 seconds, 3 seconds, and 2 seconds. Due to the different queuing times, the queuing time changing unit 160 may change the queuing time from the 2 seconds to 2.5 seconds after conversion of print data for page 1. For pages 2-10 the queuing time is changed to 3 seconds, 3.5 seconds, 4 seconds, 5 seconds, 5.5 seconds, 6 seconds, 6.5 seconds, and 7 seconds, respectively. In this case, 59 seconds are required to print 10 pages.

In FIGS. 4 to 6, the queuing time is gradually increased when the conversion time is longer than the reference time. However, the queuing time may be changed to a maximum queuing time when the conversion time is longer than the reference time. Further, in contrast to FIGS. 4 to 6, an increased queuing time may be subsequently reduced, as discussed below.

FIG. 7 illustrates operations of the image forming apparatus 100, when printing print data of 10 pages. The queuing time changing unit 160 may change the queuing time to a preset maximum queuing time when the conversion time of the image processing unit 140 is longer than a preset reference time. Alternatively, the queuing time changing unit 160 may change the queuing time to a preset minimum queuing time, when the conversion time of the image processing unit 140 is shorter than the reference time.

For example, when pages 1-6 have a 4 second conversion time, pages 7-10 have a 1 second conversion time, and the queuing time is initially set at 2 seconds, the queuing time changing unit 160 may increase the queuing time from 2 seconds to 5 seconds after conversion of print data for the first page. As such, the printing time is reduced, since the queuing time is not exceeded for subsequent pages. The 5 second queuing time may be maintained until after page 7 is printed. The queuing time changing unit 160 may change the queuing time from 5 seconds to 2 seconds after conversion of print data for the seventh page, since the conversion time is less than the 2 second minimum queuing time. In this case, the 10 pages are printed in 38 seconds.

In FIGS. 4 to 7, although an operation example of the image forming apparatus having an output rate of 30 ppm has been described. However, the present inventive concept can be applied to image forming apparatuses having faster or slower output rates.

FIG. 8 is a flowchart illustrating a method of firming an image according to an exemplary embodiment. Referring to FIG. 8, print data having a plurality of pages is received (S810). The received print data is converted into data processable in the image forming unit (S820). Specifically, the received print data may be converted into page units of bitmap image data. An image is formed on a printable medium using the converted print data (S830).

A queuing time of the image forming unit is changed, according to a conversion time of the print data (S840). Specifically, when the conversion time is longer than a preset reference time, the queuing time may be increased by a preset unit of time, or the queuing time may be set to a maximum queuing time. The changing of the queuing time may be performed on each page of the print data. The changing of the queuing time may be performed in preset page units (for example, three pages). Alternatively, the changing the queuing time may include changing the queuing time, according to a conversion time of each hardware accelerator.

It is then determined whether or not all pages are printed (S850). If so, a printing job is determined to be completed (5850-Y). If not, operation S820 is repeated for a subsequent page.

The image forming method according to the exemplary embodiment may change the queuing time of the image forming unit even when an image processing time of the print data is longer than a queuing time, to prevent reduction in the printing rate. The image forming method as shown in FIG. 8 may be executed on an image forming apparatus having the configuration of FIG. 1, as well as on image forming apparatuses having other configurations.

Although various exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. An image forming apparatus comprising:
   a communication interface unit to receive print data;
   an image processing unit to convert the received print data into pages of bitmap image data;
   an image forming unit to print each page and comprising a queuing time in which the image forming unit enters a standby state; and
   a queuing time changing unit to change the queuing time according to a conversion time taken to produce each of the pages.

2. The image forming apparatus as claimed in claim 1, wherein:
   the image forming unit is maintained in the standby state during the queuing time; and
   while in the standby state a motor in the image forming unit is continuously operated.

3. The image forming apparatus as claimed in claim 1, wherein the queuing time changing unit increases the queuing time by a unit of time when the conversion time of one of the pages is greater than a reference time.

4. The image forming apparatus as claimed in claim 3, wherein the queuing time changing unit reduces the queuing time by the unit of time when the conversion time of a subsequent one of the pages is less than the reference time.

5. The image forming apparatus as claimed in claim 3, wherein the queuing time changing unit changes the queuing time to a minimum queuing time when the conversion time of a subsequent one of the pages is less than the reference time.

6. The image forming apparatus as claimed in claim 1, wherein the queuing time changing unit increases the queuing time to a maximum queuing time when the conversion time of one of the pages is greater than a reference time.

7. The image forming apparatus as claimed in claim 1, wherein:
the image processing unit comprises hardware accelerators to convert the received print data into the pages of bitmap image data; and
the queuing time changing unit changes the queuing time according to the conversion time taken by each of the hardware accelerators to produce each of the pages.

8. The image forming apparatus as claimed in claim 7, wherein the hardware accelerators are selected from a group consisting of a scaling accelerator, a halftoning accelerator, a color conversion accelerator, a graphic processing accelerator, an image rotation processing accelerator, and any combination thereof.

9. The image forming apparatus as claimed in claim 1, wherein the queuing time changing unit changes the queuing time after printing successive ones of the pages.

10. The image forming apparatus as claimed in claim 1, wherein the queuing time changing unit changes the queuing time after printing successive groups of the pages.

11. A method of forming an image of an image forming apparatus, the method comprising:
receiving print data;
converting the received print data into pages of bitmap image data using an image processing unit;
printing each page of the bitmap image data using an image forming unit; and
changing a queuing time of the image forming unit, the queuing time being when the image forming unit enters a standby state, according to a conversion time taken to produce each of the pages.

12. The method as claimed in claim 11, wherein:
the image forming unit is maintained in the standby state during the queuing time; and
while in the standby state, a motor of the image forming unit is continuously operated.

13. The method as claimed in claim 11, wherein the changing of the queuing time comprising increasing the queuing time by a unit of time when the conversion time of one of the pages is greater than a reference time.

14. The method as claimed in claim 13, wherein the changing of the queuing time further comprises reducing the queuing time by the unit of time when the conversion time of a subsequent one of the pages is less than the reference time.

15. The method as claimed in claim 13, wherein the changing of the queuing time further comprises changing the queuing time to a minimum queuing time when the conversion time of subsequent one of the pages is less than the reference time.

16. The method as claimed in claim 11, wherein the changing of the queuing time comprises changing the queuing time to a maximum queuing time when the conversion time of one of the pages is greater than a reference time.

17. The method as claimed in claim 11, wherein:
the converting of the print data comprises using hardware accelerators of the image processing unit; and
the changing of the queuing time comprises changing the queuing time according to conversion times taken by each the hardware accelerators to produce each of the pages.

18. The method as claimed in claim 11, wherein the changing of the queuing time comprises changing the queuing time after subsequent ones of the pages are printed.

19. The method as claimed in claim 11, wherein the changing of the queuing time comprises changing the queuing time after subsequent groups of the pages are printed.

* * * * *